June 4, 1929.  P. SIMON  1,715,721
COOKING UTENSIL
Filed Jan. 12, 1925

INVENTOR
PETER SIMON
BY
Alexander Chessin
ATTORNEY

Patented June 4, 1929.

1,715,721

UNITED STATES PATENT OFFICE.

PETER SIMON, OF BINGHAMTON, NEW YORK, ASSIGNOR TO SIMON UTENSIL CORPORATION, OF NEW YORK, N. Y., A CORPORATION OF NEW YORK.

COOKING UTENSIL.

Application filed January 12, 1925. Serial No. 1,875.

My invention relates to cooking utensils and, more particularly, to that class of such utensils comprising double vessels or containers.

One of the objects of my invention is to provide means for cooking certain foods in a container which does not come in direct contact with the stove or fire; another object is to provide free circulation of the water or other liquid in which the food is cooked; still another object is to provide means for draining the water or other liquid from the container without removing the latter from the outer vessel in which it is placed; other objects will become apparent from the detailed description of my invention which follows.

Figures 1, 2:
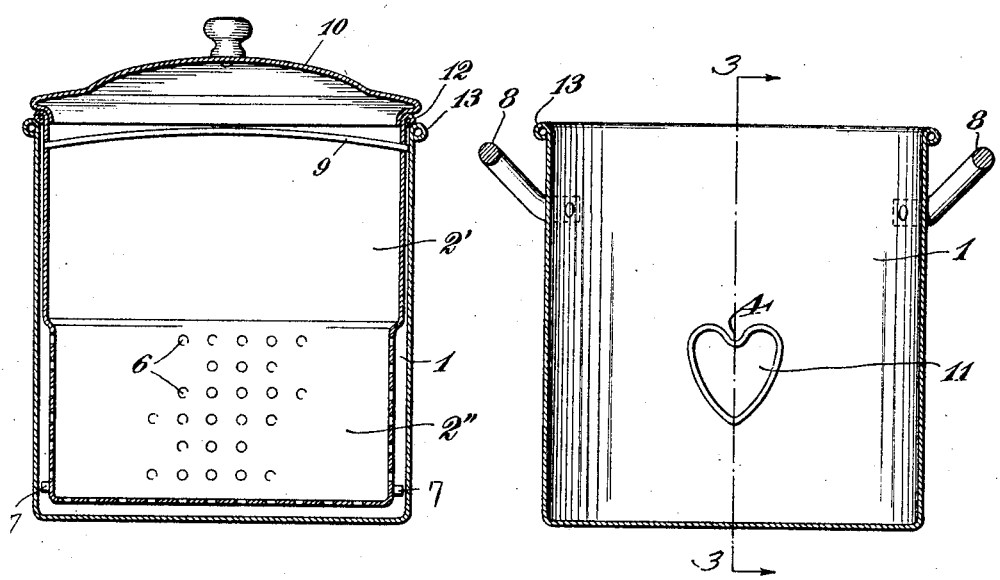
Figures 3, 4:
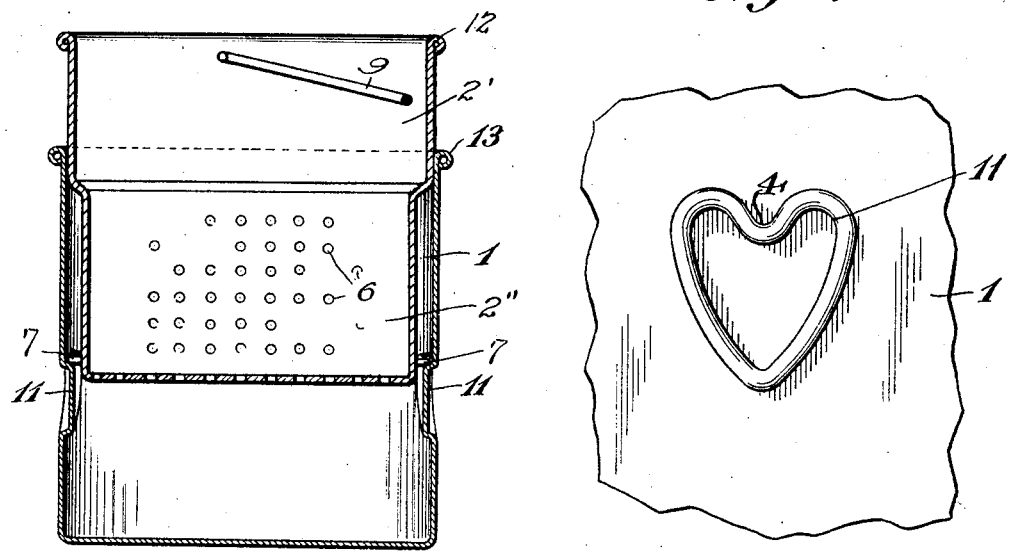

Referring to the drawings, Figure 1 is a vertical cross section of a device embodying my invention comprising two vessels, the inner vessel being shown in position for cooking; Figure 2 is a vertical cross section of the outer vessel; Figure 3 is a vertical cross section of the same device but with the inner vessel raised, the cross section being taken along the line 3—3 of Figure 2; and Figure 4 is a detail of the guiding device forming a part of my invention.

In these drawings, 1 is an outer vessel; 2′ and 2″ are, respectively, the upper and the lower portions of an inner vessel; 11 are heart shaped guides on the wall of the inner vessel 1. These guides may be ribs secured to the inner wall of the outer vessel 1, or inwardly projecting indentations or depressions in the wall itself, or they may be formed by a surface depression in this wall having a periphery which acts as a guide, instead of having line-guides.

The guides comprise, at their highest points, seats 4, for a purpose which will be explained further below, each one of these seats being located in the cusp of a heart. The enlarged portion 2′ of the inner vessel is adapted to rest on the seats 4 when the vessel is in the position for cooking shown in Figure 1. The lower portion of this vessel, i. e. the portion 2″, is shown as having suitable perforations which extend to the bottom thereof, but I do not mean to restrict myself to this feature, as my cooking utensil may be without such perforations. On the lower portion 2″ of the inner vessel are secured pins 7, shown in the drawing as near the bottom of the vessel, but these pins may be placed higher if desired. The outer and the inner vessels are provided with handles 8 and 9, respectively, and a cover 10 is provided for the outer vessel. The rim 12 of the inner vessel rests on the rim 13 of the outer vessel when the inner vessel is completely within the outer receptacle. However, I may dispense with the rim 12 and let the inner vessel assume the position shown in Figure 1, by allowing it to rest on the seats 4.

The operation of my device is so simple that only a few lines need to be added to the description of it. When the inner vessel is in the position shown in Figure 1, i. e. when it is completely within the outer vessel, the enlarged upper portion 2′ of the inner vessel in Figure 1 rests on top of the seats 4 of the guides 11, the proportions of the vessels being such that in this position the bottom of the inner vessel does not touch the bottom of the outer vessel but remains within a predetermined distance above it. In this manner, the inner vessel never comes in contact with the stove or fire. At the same time, the space between the walls of the inner and of the outer vessels, below the portion 2′, together with the space between the two bottoms, permits free circulation of the water, oil, or grease used in the cooking, this free circulation being extended into the inner vessel through the perforations 6 when such an extension is desired, or being prevented from such extension by omitting the perforations 6. When I rely on the rim 12 of the inner vessel, resting on the rim 13 of the outer vessel, to hold the inner vessel in the desired position, above the bottom of the outer vessel, it is not necessary to have the upper portion 2′ of the inner vessel rest on the seats 4 of the heart shaped guides.

To raise the inner vessel, the operator takes hold of it by the handle 9 and lifts the vessel until the pins 7 come in contact with the heart shaped guides 11, then he guides the vessel, with the pins 7 following the contour of the heart shaped projections, until these pins come to rest in the cusps 4 of the hearts. The closed contour of these heart shaped guides eliminates the possibility of the pins getting under the seats 4.

While, in the drawings, diametrically opposite guides are shown, I do not mean to restrict myself to this construction, and I may use more than two such guides in some instances.

The selection of the heart shape to illustrate the device has no other than a sentimental reason. Obviously, any closed contour of similar characteristics will do as well. Other changes, additions and omissions may, of course, be made by those versed in the art without departing from the spirit and scope of my invention.

I claim:

1. In a cooking utensil, the combination with an outer vessel having heart shaped inwardly projecting guides on the wall thereof, of an inner vessel having a portion fitting into said outer vessel snugly enough to be incapable of passing said guides, and laterally projecting pins on said inner vessel adapted to slide on said guides and to rest in the cusps of said hearts.

2. In a cooking utensil, the combination with an outer vessel having diametrically opposite heart shaped inward depressions in the wall thereof, of an inner vessel loosely fitting into said outer vessel except for a portion of larger diameter snugly fitting into said outer vessel and adapted to rest on said heart shaped depressions, and pins on said inner vessel adapted to slide along the periphery of said heart shaped depressions and to rest in the cusps of the hearts.

3. In a cooking utensil, the combination with an outer vessel, of an inner vessel, means for holding said inner vessel in a first position where its bottom is slightly above the bottom of said outer vessel, means for holding said inner vessel in a second position substantially above said first position, and means for raising or lowering said inner vessel from one of said positions to the other by imparting a rotary motion thereto, which means comprise guides formed by inward depressions in the wall of said outer vessel, each guide having a closed contour, and pins on said inner vessel adapted to slide along said guides.

4. In a cooking utensil, an inner and an outer container, guides on the wall of one of said containers, each guide being arranged to form a closed contour, and pins projecting from the other one of said containers adapted to follow said guides.

5. In a cooking utensil, an inner and an outer container, guides on the wall of one of said containers, each guide being arranged to form a closed contour, and means on the other one of said containers cooperating with said guides to cause elevation of said inner container when a rotary motion is imparted thereto.

6. In a cooking utensil, an inner and an outer container, guides on the inner wall of said outer container, each guide being arranged to form a closed contour, and pins laterally projecting from said inner container and adapted to follow said guides.

7. In a cooking utensil, an inner and an outer container, guides on the wall of one of said containers, each guide being arranged to form a heart shaped contour, and pins projecting from the other one of said containers adapted to follow said guides.

8. In a cooking utensil, an inner and an outer container, guides on the inner wall of said outer container, each guide being heart shaped in form, and pins laterally projecting from said inner container and adapted to follow said guides.

9. In a cooking utensil, an inner and an outer container, guides on the inner wall of said outer container, each guide being heart shaped in form, pins projecting from said inner container, and cusps on said heart shaped forms adapted to receive said pins to hold said inner container in an elevated position.

PETER SIMON.